US011825811B2

(12) United States Patent
Hoskinson

(10) Patent No.: US 11,825,811 B2
(45) Date of Patent: Nov. 28, 2023

(54) CANINE CARRIED RESCUE HARNESS

(71) Applicant: FIDO PRO CORP, Denver, CO (US)

(72) Inventor: Paul Hoskinson, Denver, CO (US)

(73) Assignee: Paul Hoskinson, Littleton, CO (US)

( * ) Notice: Subject to any disclaimer, the term of this patent is extended or adjusted under 35 U.S.C. 154(b) by 0 days.

(21) Appl. No.: 17/488,121

(22) Filed: Sep. 28, 2021

(65) Prior Publication Data
US 2022/0095581 A1 Mar. 31, 2022

Related U.S. Application Data

(60) Provisional application No. 63/085,803, filed on Sep. 30, 2020.

(51) Int. Cl.
*A01K 1/02* (2006.01)
(52) U.S. Cl.
CPC .................. *A01K 1/0263* (2013.01)
(58) Field of Classification Search
CPC .. A01K 1/0263; A01K 1/0272; A01K 1/0281; A01K 1/029; A01K 15/04; A01K 27/002
USPC .......................................... 119/792; 907/702
See application file for complete search history.

(56) References Cited

U.S. PATENT DOCUMENTS

| 3,535,718 | A | 10/1970 | Murcott |
| 3,535,719 | A | 10/1970 | Murcott |
| 4,414,969 | A | 11/1983 | Heyman |
| 4,831,967 | A | 5/1989 | Anderson |
| 5,193,486 | A | 3/1993 | Kitchens |
| D360,492 | S | 7/1995 | Horn |
| 5,531,187 | A | 7/1996 | Ward |
| 5,644,902 | A | 7/1997 | Kemp |
| 5,738,043 | A | 4/1998 | Manuel |
| 5,823,146 | A | 10/1998 | Alaniz |
| 6,123,049 | A | 9/2000 | Slater |
| 6,286,461 | B1 | 9/2001 | Martz |
| 6,595,162 | B1 | 7/2003 | Hibbert |
| 6,607,107 | B2 | 8/2003 | Dexheimer |
| 6,802,282 | B2 | 10/2004 | Muckleroy |
| 7,353,779 | B2 | 4/2008 | Altieri |
| 8,474,412 | B1 | 7/2013 | Walden et al. |
| 9,295,234 | B2 * | 3/2016 | Shewfelt .............. A01K 1/0272 |
| 9,320,260 | B2 | 4/2016 | Zimmerman |
| 9,339,012 | B2 | 5/2016 | McClain |
| 9,681,758 | B2 | 6/2017 | Lau |

(Continued)

FOREIGN PATENT DOCUMENTS

| DE | 202011102300 | 1/2011 |
| DE | 202011107584 | 1/2012 |
| FR | 2906445 | 4/2008 |

OTHER PUBLICATIONS

RNR Dog Lift Harness, Rock N Rescue, https://www.rocknrescue.com/product/rnr-dog-harness/ Sep. 28, 2021.

*Primary Examiner* — David J Parsley
*Assistant Examiner* — Danielle A Clerkley
(74) *Attorney, Agent, or Firm* — Russell Manning; FisherBroyles, LLP

(57) ABSTRACT

A dog rescue harness that is configured to be carried by a dog. The rescue harness is incorporated with a dog chest harness. The rescue harness may be stowed on or within the chest harness prior to use. If needed, the rescue harness may be deployed.

7 Claims, 7 Drawing Sheets

(56) References Cited

U.S. PATENT DOCUMENTS

| | | |
|---|---|---|
| 10,716,287 B2 | 7/2020 | Keith |
| 10,932,438 B2 | 3/2021 | Hoskinson |
| 2003/0127060 A1 | 7/2003 | Yeung |
| 2005/0238261 A1 | 10/2005 | Godshaw |
| 2005/0005875 A1 | 12/2005 | Suggs |
| 2005/0263102 A1 | 12/2005 | Sherman |
| 2006/0049227 A1 | 3/2006 | Godshaw |
| 2011/0127309 A1 | 6/2011 | Chua |
| 2012/0160184 A1* | 6/2012 | Lichvar ............... A01K 27/002 119/725 |
| 2015/0296748 A1* | 10/2015 | Sporn ................ A01K 15/02 119/863 |
| 2016/0174528 A1 | 6/2016 | Dyson |
| 2017/0325424 A1 | 11/2017 | Juarez |
| 2018/0139921 A1 | 5/2018 | Kath |
| 2018/0192613 A1 | 7/2018 | Keith |
| 2019/0014887 A1 | 1/2019 | Soltez |
| 2019/0327931 A1* | 10/2019 | Mohr ............... A01K 1/0263 |

* cited by examiner

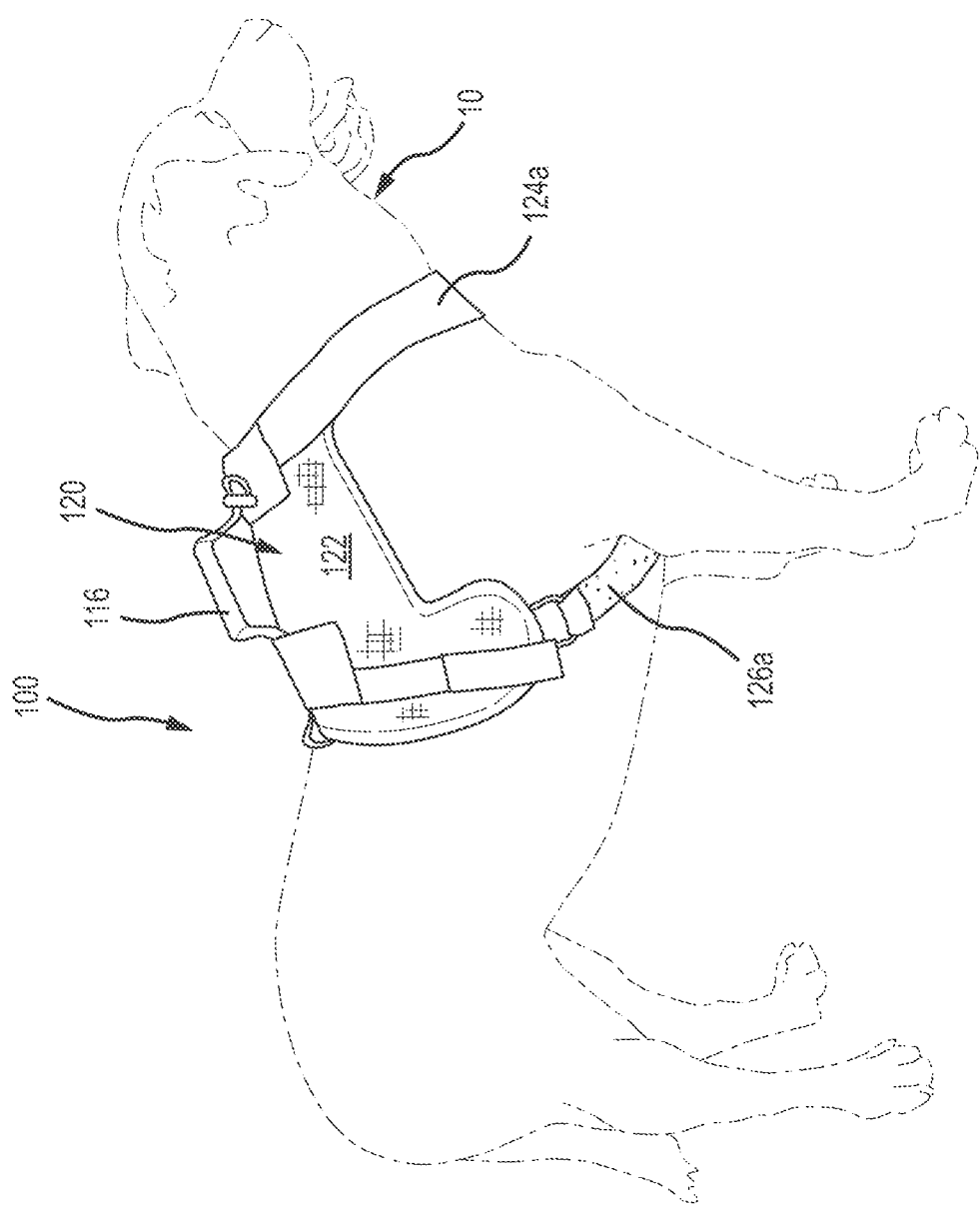

CANINE CARRIED RESCUE HARNESS

CROSS-REFERENCE

The present application claims the benefit of the filing date of U.S. Provisional Application No. 63/085,803 having a filing date of Sep. 30, 2020, the entire contents of which is incorporated herein by reference.

FIELD

The present disclosure relates to canine rescue harnesses. More specifically, the present discourse related to a canine rescue harness that is integrated into a canine chest harness.

BACKGROUND

There have been many publicized instances of dogs being injured as a result of hiking or running with their owners on backcountry trails. If the dog is not able to or unwilling to walk, the owner must struggle to carry and transport the dog to safety. If the owner cannot physically carry the injured dog with his or her arms, the owner may attempt to carry the injured dog in a standard backpack if available. However, this is not an option if the owner lacks a backpack. In most cases, the owner must abandon the pet and find help because either their backpack is too small to safely contain the injured dog or they lack a backpack. Abandoning the dog to find help leaves the injured dog at further risk for more injury or death.

Recently, a number of dog recue harnesses have been proposed. Such rescue harnesses typically include a sling having a fabric body with four leg holes. Additionally, such rescue harnesses typically include integrated or attachable shoulder straps that allow an owner to carry the injured dog once the dog is within the sling. While effective, owners may be reluctant to carry such a rescue harness due to weight and/or space limitations.

SUMMARY

Provided herein, is a dog rescue harness that is configured to be carried by a dog. The rescue harness is incorporated with a dog chest or body harness. The rescue harness may be stowed on or within the body harness prior to use. If needed, the rescue harness may be deployed allowing an injured dog to be carried by the rescue harness and the body harness.

The rescue harness is formed from a pliable panel (e.g., fabric). In one arrangement, the panel has a forward edge, a rearward edge, a first side or lateral edge and a second side or lateral edge. In such an arrangement, the panel may be four sided, though other shapes are possible. In any arrangement, a pair of leg-receiving holes extend through the panel. The leg-receiving holes are configured to receive the rear legs of a canine. A strap connects opposing edges (e.g., the first and second lateral edges) of the fabric panel. The strap may include a first strap attached to the first edge and a second strap attached to the second edge where the first and second straps are connectable. The strap(s) may be adjustable and may be utilized as a first shoulder strap. A forward end (e.g., forward edge) of the rescue harness is fixedly connected to or removably connected to a body harness disposable about a canine's chest (e.g., behind and forward of the front legs of a canine). A second strap, which may include first and second connectable straps, is attachable to first and second attachment points on the chest harness. The second strap may be adjustable and may be used as a second shoulder strap. When utilized, the recue harness, body harness and shoulder straps may be used to suspend an injured canine on the back or chest of a user.

The rescue harness may initially be in a non-deployed configuration. By way of example, the rescue harness may be stowed within a pocket or compartment of the body harness. Alternatively, the rescue harness may be folded and secured to the body harness (e.g., via buttons, snaps, straps, etc.). When needed, the rescue harness may be deployed. Once deployed and extended from the body harness, the rear legs of the dog may be disposed through the leg-receiving holes in the rescue harness. The first and second shoulder straps may be connected and/or adjusted to allow an owner/user to carry the injured dog either on their back or with the dog facing forward (e.g., in front of the chest of the owner/user). The strap(s) for the rescue harness may be fixedly connected with the rescue harness or may be a separate strap(s) stowed on or within the body harness. The strap(s) for the body harness may likewise be fixedly connected to the body harness or may be a separate strap(s) stowed on or within the body harness. In any configuration, a dog wearing the rescue harness system (e.g., body harness and rescue harness) may carry everything needed to safely carry the canine if the canine is injured.

The body harness may have any appropriate configuration so long as it securely fits about a canine such that it may suspend the canine. In a non-limiting arrangement, the body harness includes a back panel configured to be positioned over a portion of a canine's back and a chest panel configured to be positioned below a portion of the canine's chest. These panels are typically connected by two sets of straps. A first set of straps extend between rearward lateral portions of the back panel and rearward lateral portions of the chest panel on both sides of the canine's torso. That is, the first set of straps extend between the back and chest panel behind forward legs of a canine wearing the body harness. A second set of straps extend between forward lateral portions of the chest harness between the back panel and forward lateral portions of the chest panel on both sides of the canine's neck. The second set of straps extend in front of the front legs of a dog wearing the body harness. In this arrangement, a forward edge of the rescue harness is connected to the chest panel of the body harness. In a further arrangement, the chest panel may include a pocket for stowing the rescue harness when not in use.

BRIEF DESCRIPTION OF THE DRAWINGS

FIG. 1A is a side view of a dog wearing a canine rescue harness system prior to deployment.

DETAILED DESCRIPTION

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

Figure 1B:
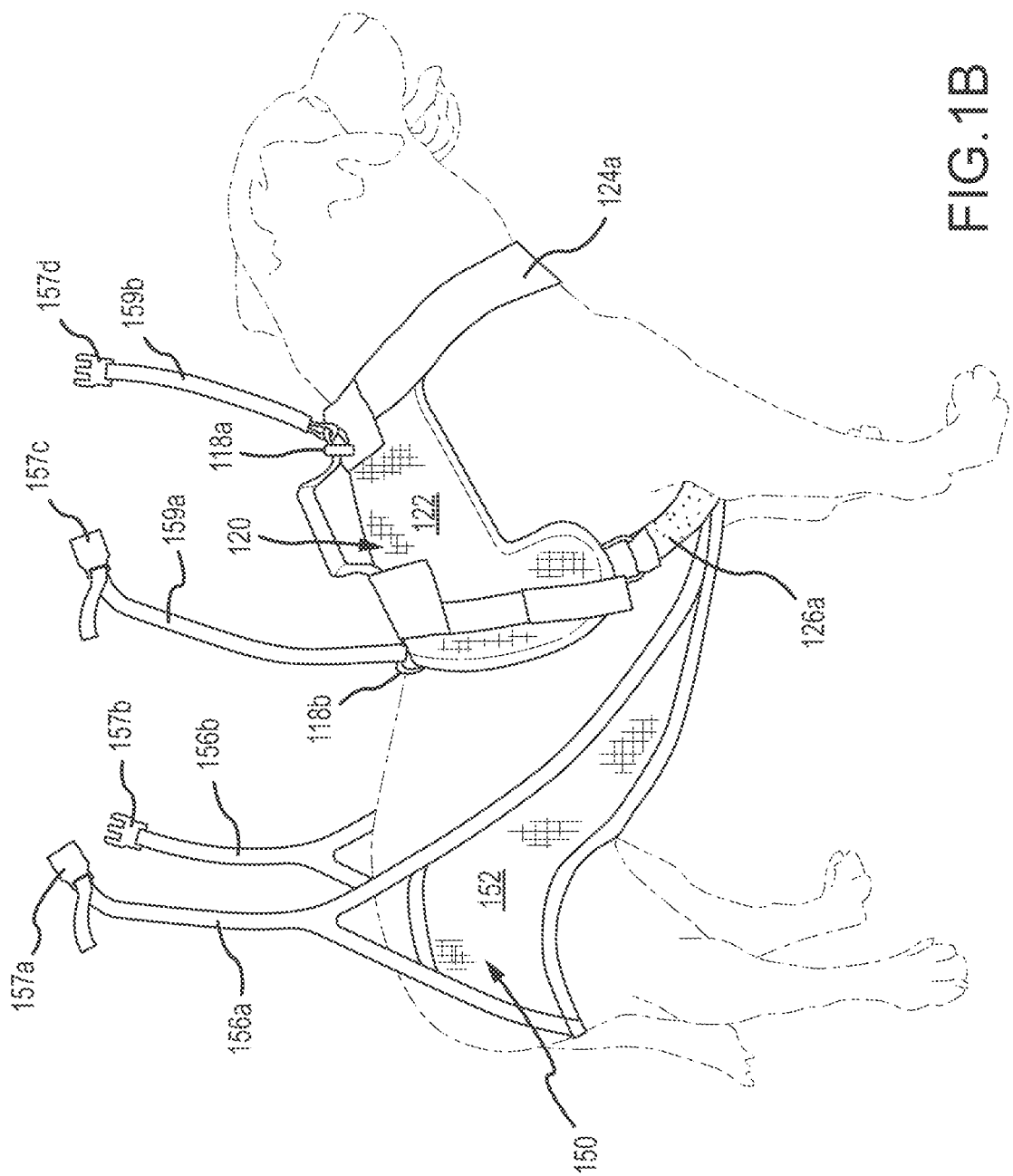
FIG. 1B is a side view of the dog wearing the canine rescue harness system with a rescue harness deployed.
Figure 2A:
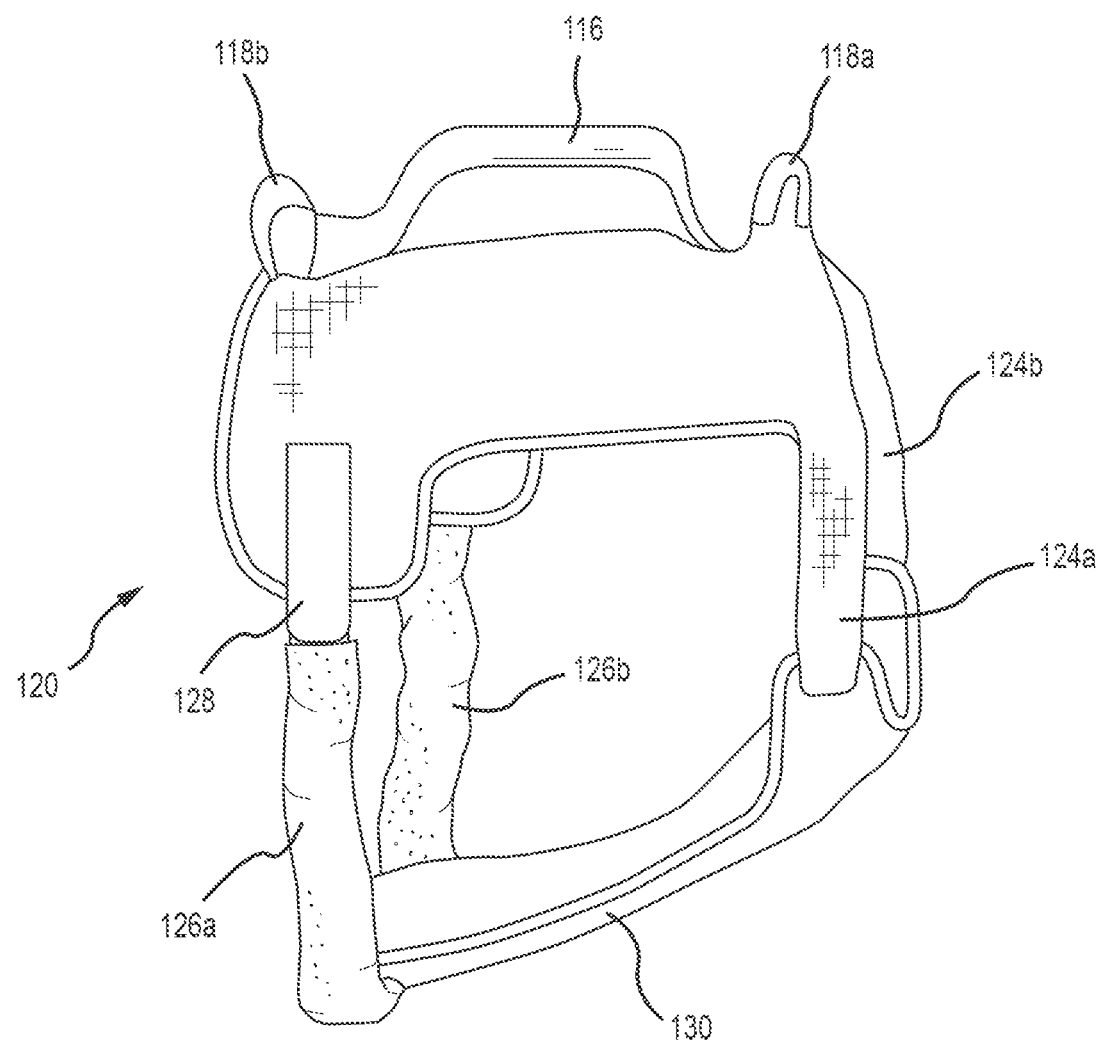
FIG. 2A is a side view of a body or chest harness of the canine rescue harness system.
Figure 2B:
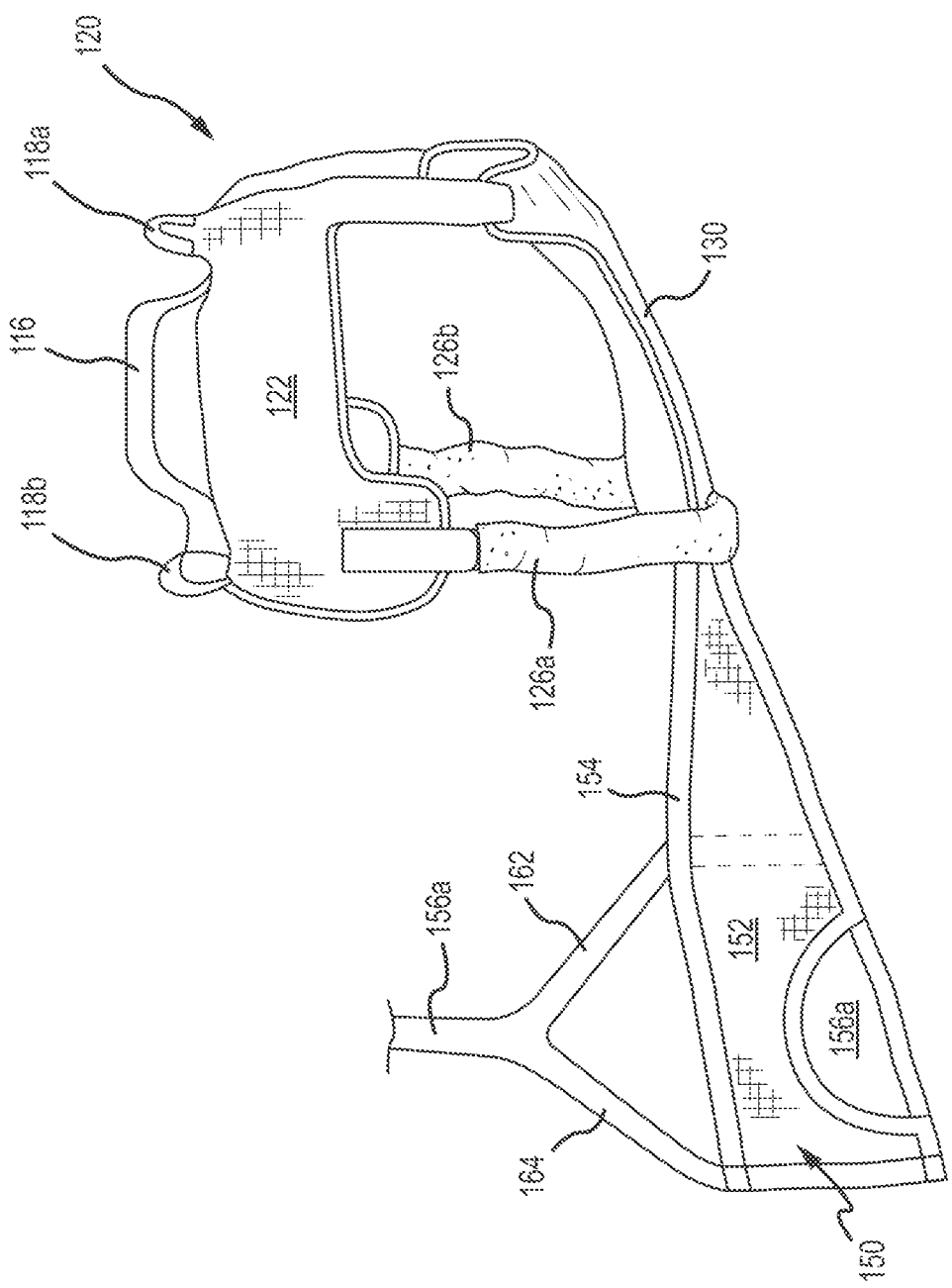
FIG. 2B is a side view of the body harness and a rescue harness.

FIGS. 1A and 1B illustrate a dog 10 wearing a canine rescue system 100, in a non-deployed position and a deployed position, according to an embodiment. As shown, the rescue system 100 includes two primary components, a body or chest harness 120 and a rescue harness 150, which may be attached to and/or deployed from the body harness 120. In the illustrated embodiment, the body harness 120 includes a top or back panel 122 (e.g., flexible panel, fabric etc.) that is configured to fit on a portion of the dog's back and which may flare out around the torso in front and/or behind the dog's front legs. The body harness also includes a chest panel 130 (e.g., flexible fabric panel) configured to fit against the dog's chest between its front legs. See also FIGS. 2A and 3A. The back panel 122 and the chest panel 130 are secured to one another with a pair of forward straps 124a, 124b (hereafter 124 unless specifically referenced), which extend between the back panel 122 and the chest panel 130 in front of the dog's front legs and on opposite sides of the dog's neck. The back panel 122 and the chest panel 130 are also secured to one another with a pair of rearward straps 126a, 126b (hereafter 126 unless specifically referenced), which extend between the panel 124, 130 behind the dog's front legs on opposite sides of the dog's torso. Each pair of straps 124, 126 may be enclosed in a padding covering. The front and rear straps may each have a first end fixedly connected (e.g., sewn) to either the back panel 122 or the chest panel 130. Most commonly, one second end of the front and rear straps connects to the back panel or the chest panel utilizing an adjustable connector 128. The connector may be any adjustable connector configured for use with straps. In this regard, the front and rear straps 124, 126 are adjustable to securely fit the harness 120 to the dog.

The back panel 122 may further include connection points 118a, 118b (hereafter 118 unless specifically referenced). These connection points may be formed, without limitation, of metal circular rings, D-rings or reinforced fabric loops. In an embodiment, the back panel also includes a carrying handle 116 fixedly attached (e.g., sewn) thereto. It will be further appreciated that the back panel 130 may include various other pockets and/or connectors (e.g., Velcro, straps, buckles, etc.), which may allow for attaching components (e.g., packs) to the back panel.

It will be appreciated that the illustrated body/chest harness is presented by way of illustration and not by way of limitation. That is, numerous canine body harness designs are available. For instance, one-piece stretchable neoprene harnesses are available. Likewise, body harnesses having a chest strap and a neck strap connected to a back panel and free of a chest panel are available. Aspects of the present disclosure may be utilized with varying differing types of harnesses. However, for backcountry use, body harnesses having a chest panel are typically preferred as they provide a layer of puncture protection for a dog from, for example, sticks, thorns etc. Generally, any body harness that surrounds a torso and front legs of a canine may be utilized.

Figure 3A:
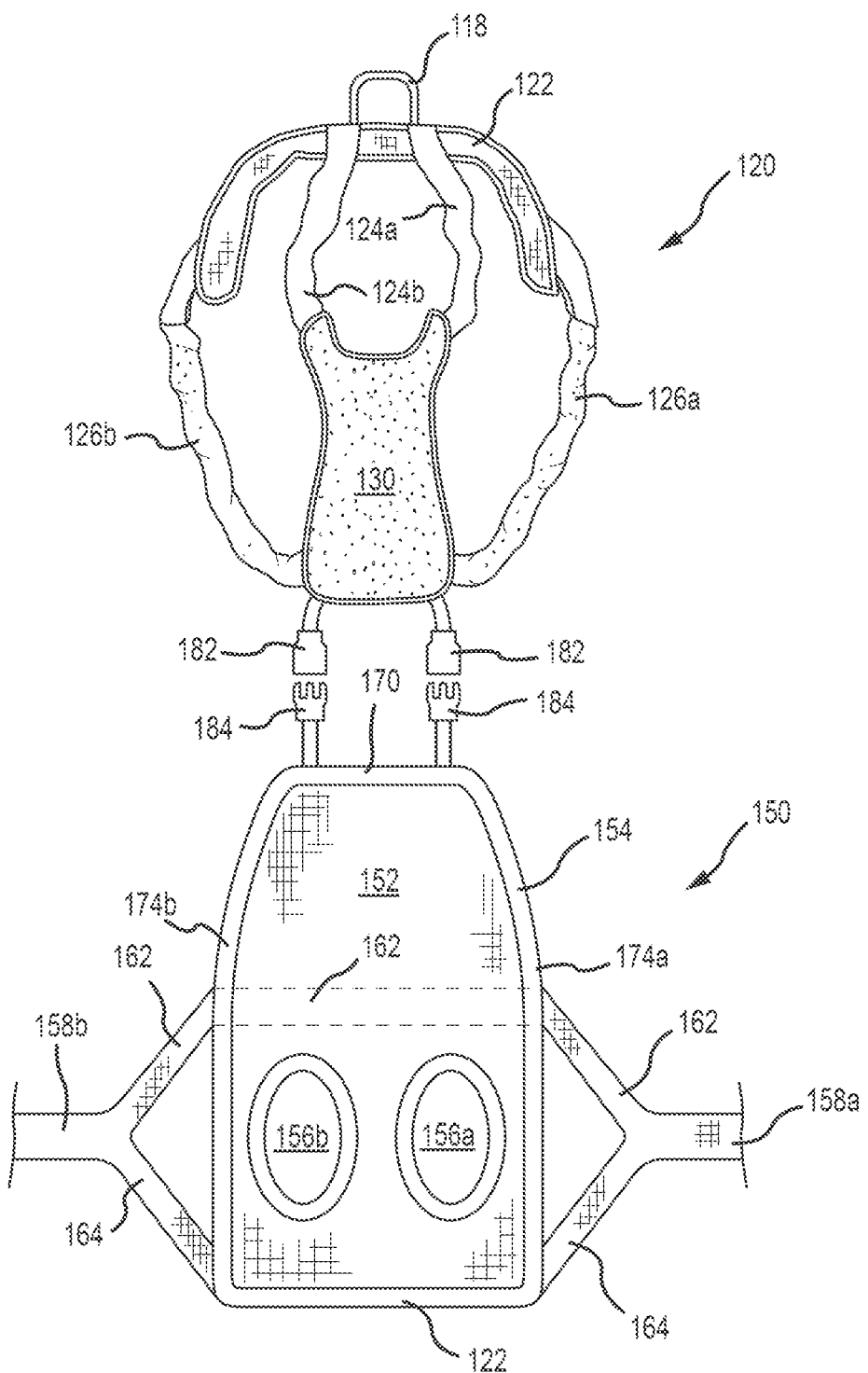
FIG. 3A is a rearward view of the interior of the body harness and removably connected rescue harness in a deployed position.
Figure 3B:
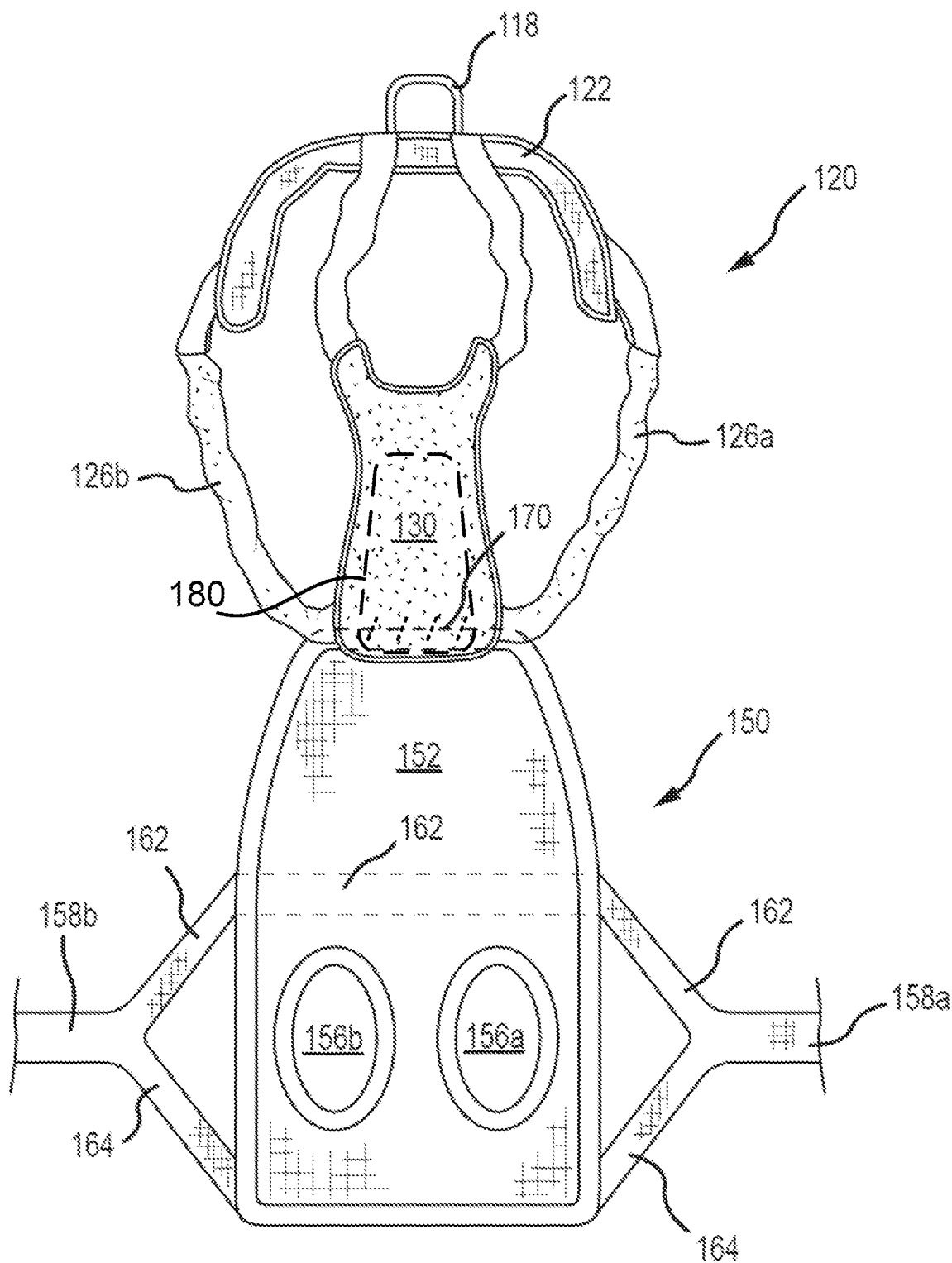
FIG. 3B is a rearward view of the interior of the body harness and a fixedly connected the rescue harness in a deployed position.

As illustrated in FIGS. 3A and 3B, the rescue harness 150 is formed from a pliable support panel 152 (e.g., fabric). The support panel 152 may be formed from any durable fabric. In the illustrated embodiment, the panel 152 has a forward edge 170, a rearward edge 172, a first side or lateral edge 174a and a second side or lateral edge 176a. In such an arrangement, the panel 152 may be four sided, though other shapes are possible. For instance, the panel may be rounded at the corners. Regardless of the shape of the panel, the panel will typically include a forward end/edge and a rearward end/edge and two lateral edges extending between the forward and rearward edges. In the present embodiment, a reinforcing strap 154 is sewn around the periphery of the support panel 152 defined by the panel edges 170, 172, 174a, 174b. A pair of leg-receiving holes 156a, 156b (hereafter 156 unless specifically referenced) extend through the panel 152. The leg-receiving holes 152 are configured to receive the rear legs of a canine. In an embodiment, the peripheries of the leg-receiving holes may be reinforced by a reinforcing strap.

In the illustrated embodiment, the rescue harness 150 connects to the body harness 120. More specifically, the forward edge 170 of the rescue harness 150 connects to the rearward portion of the chest panel 130. See FIGS. 3A and 3B. In other embodiments, the rescue harness 150 could connect to the back panel 124 and/or the straps 126 connecting the back panel 124 and the chest panel 130. In one embodiment, the forward edge of the support panel 152 is releasably connected to the chest panel 130 utilizing strap mating straps and buckles 182, 184 connected to the chest panel 130 and rescue harness 150, respectively. In another embodiment, the forward edge 170 the support panel 152 is sewn to the chest panel 130. See FIG. 3B.

Connected to the lateral edges 174a, 174b of the support panel 152 are first and second straps 158a, 158b (hereafter 158 unless specifically referenced). These support panel straps or lateral edge straps 158 each connect to one lateral edge 174 of the support panel 152 via a Y-strap connector 160 formed of first and second support straps 162, 164. The first and second support straps 162 extend across a bottom surface (e.g., outside surface) of the support panel 152 and extend beyond the lateral edge of the support panel 152. Free ends of the support straps 162, 164 are connected (e.g., sewn) to form the Y-strap connector attached to the straps 158. As will be appreciated, one of the support straps may continue past the Y-strap connector and form one of the support panel straps 158. Typically, the support straps 162, 164 are disposed in front and behind, respectively, of the leg-receiving apertures 156. Placement of the support straps 162, 164 in front and behind the leg receiving apertures helps distribute the weight of the dog when the dog is lifted utilizing the canine rescue system. When the straps 158 are connected via a Y-connection, the first strap (e.g., first lateral edge strap) connects to a first lateral edge of the support panel at two points of connection and the second strap (e.g., second lateral edge strap) connects to the second lateral edge of the support panel at two points of connection. Such a connection allows for better distributing the weight of a dog within the harness when the on a user's back.

Figure 4:
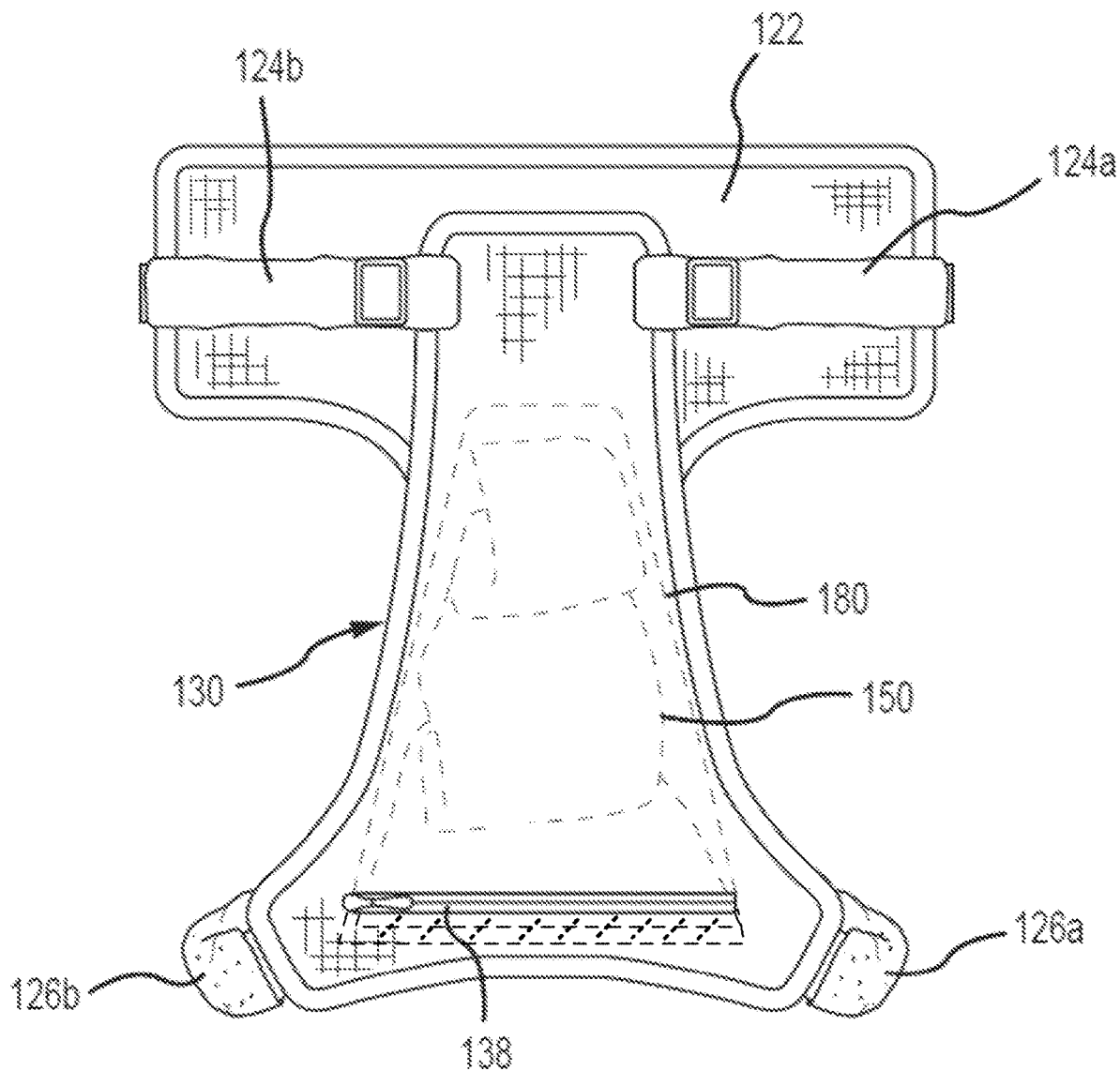
FIG. 4 is a bottom view of the body harness with the rescue harness in a sowed position.

The pliable panel allows the rescue harness 150 to be folded and secured to or within the chest panel. That is, use of the pliable fabric panel 152 allows the rescue harness 150 to be stowed when not in use. FIG. 4 illustrates a bottom view of the body harness 120. In this embodiment, the bottom surface of the chest panel 130 includes a zipper 138.

The zipper 138 allows opening and closing a pocket 180 (shown in phantom) formed between fabric layers of the chest panel 130. That is, the chest panel 130 may have at least one upper fabric layer and an at least one lower fabric layer connected about their peripheries to form the pocket 180 within the chest panel 130. This pocket 180 may be utilized to stow the rescue harness 150 when not in use. That is, the rescue harness may be folded and placed in the pocket. The zipper or other fastener may then be closed to maintain the rescue harness within the pocket until needed. In an embodiment, the forward edge of the rescue harness is sewn to an interior of the pocket.

When needed, the rescue harness 150 may be deployed and the dog's rear legs may be disposed through the leg-receiving holes 156. See FIG. 1B. At this time, free ends of the panel support straps 156a and 156b of the rescue harness may be connected by connectors 157a and 157b located on or near the free ends of the straps 156. The resulting connected strap (not shown) may from a first shoulder strap for use in carrying the dog in the rescue harness system. A second set of shoulder straps 159a, 159b may be connected to the connection points 118a, 118b on the back panel 122 of the body harness 120. The second shoulder straps 159a, 159b may be stowed on or within the body harness 120 (e.g., within the packet 180 of the chest panel 130). In the illustrated embodiment, the second strap 159 is illustrated as a two-piece strap. However, in a further embodiment, the second shoulder strap may be a single strap that connects to the connection points 118a, 118b via a Y-strap connector. In such an embodiment, a free end of the strap may have an adjustable loop configured to fit around a user's shoulder. Use of such a Y-strap connector on the body harness and rescue harness may allow the shoulder straps to be closer together when deployed to better fit a user's shoulders. In any embodiment, once the shoulder straps are connected, a user may readily transport an injured dog. It will further be appreciated that the shoulder straps 158 and 159 may include a connecting strap (not shown) that allows connecting the straps together, for example, across a user's chest when carrying a dog on their back.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. A canine rescue apparatus configured to be carried by a canine, comprising: a body harness configured to surround a portion of a chest of a dog about its front legs the body harness having a chest portion configured to be positioned below said chest of said dog, the chest portion having a pocket; a rescue harness configured to move between a stowed position within the pocket of the chest portion and a deployed position, the rescue harness having: a support panel having first and second leg-receiving holes traversing through the support panel, the support panel having a forward edge fixedly attached to an interior of the pocket in the chest portion of the body harness; at least a first strap connecting first and second lateral edges of the support panel; and a second strap connectable to the body harness, wherein the first and second straps form shoulder straps for use in carrying a dog via the body harness and rescue harness; wherein the support panel and the first strap of the rescue harness may be disposed within the pocket while the forward edge of the support panel remains fixedly attached to the interior of the pocket in the chest portion of the body harness; and wherein the pocket is configured to be closed with the rescue harness in the stowed position within the pocket of the chest harness.

2. The canine rescue apparatus of claim 1, wherein the first shoulder strap includes:
   a first lateral edge strap connected to the first lateral edge of the support panel; and
   a second lateral edge strap connected to the second lateral edge of the support panel, wherein a free end of the first lateral edge strap is removably attachable to a free end of the second lateral edge strap.

3. The canine rescue apparatus of claim 1, wherein the first shoulder strap comprises a first lateral edge strap and a second lateral edge strap, which connect the first and second lateral edges of the support panel, respectively, via a Y-connection, wherein the first lateral edge strap connects to the first lateral edge of the support panel at two points of connection and the second lateral edge strap connects to the second lateral edge of the support panel at two points of connection.

4. The canine rescue apparatus of claim 3, further comprising:
   first and second support straps, each support strap connected to an outside surface of the support panel and extending between and from one of the two points of connection to the first lateral edge of the support panel to an opposite corresponding one of the two points of connection to the second lateral edge of the support panel.

5. The canine rescue apparatus of claim 4, wherein the first support strap is disposed across the support panel at a location forward of the leg-receiving holes and the second support strap is disposed across the support panel at a location rearward of the leg-receiving holes.

6. The canine rescue apparatus of claim 1, wherein the body harness comprises a back panel, a chest panel and one or more straps connecting the back panel and the chest panel.

7. The canine rescue apparatus of claim 1, wherein the pocket includes a zipper for opening and closing the pocket, wherein the zipper may be closed when the rescue harness is in the stowed position within the pocket.

* * * * *